Figure 1:
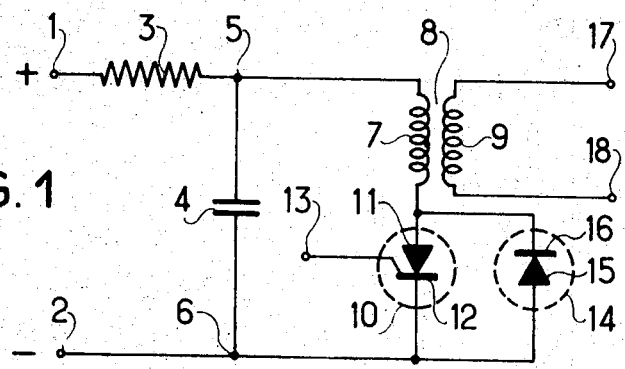

United States Patent

[11] 3,566,150

| [72] | Inventor | Pierre Nollace, Lamanon, France |
| --- | --- | --- |
| [21] | Appl. No. | 713,975 |
| [22] | Filed | Mar. 18, 1968 |
| [45] | Patented | Feb. 23, 1971 |
| [73] | Assignee | Compagnie Generale D'Electronique Industrielle Lepaute Paris, France |

[54] IMPULSE GENERATOR CIRCUIT FOR THE CONTROL OF RECTIFIERS
2 Claims, 2 Drawing Figs.

[52] U.S. Cl. .................................................. 307/108,
321/45, 317/33
[51] Int. Cl. .............................................. H03k 3/00
[50] Field of Search....................................... 307/107, 108, 132, 93; 321/45 (C); 317/33 (SCR), 49, 50

[56] References Cited
UNITED STATES PATENTS

| 3,246,206 | 4/1966 | Chowdhuri | 317/33SCR |
| --- | --- | --- | --- |
| 3,329,838 | 7/1967 | Myers | 307/125 |
| 3,353,066 | 11/1967 | DeSouza | 317/33SCR |
| 3,286,155 | 11/1966 | Corey | 321/45C |
| 3,321,697 | 5/1967 | Etter | 321/45C |
| 3,331,011 | 7/1967 | Landis | 321/45C |
| 3,376,492 | 4/1968 | Morgan et al. | 321/43 |
| 3,388,310 | 6/1968 | Etter | 321/45X |
| 3,406,327 | 10/1968 | Mapham et al. | 321/45 |
| 3,422,280 | 1/1969 | Olson | 307/132 |

*Primary Examiner*—Robert K. Schaefer
*Assistant Examiner*—H.J. Hohauser
*Attorney*—Craig, Antonelli, Stewart & Hill

ABSTRACT: Generator of an electrical impulse having a steep wavefront for extinguishing voltage controlled rectifiers including a capacitor charging circuit in parallel with the series combination of an inductance and a control voltage controlled rectifier, and an oppositely poled diode in parallel with said control voltage controlled rectifier.

INVENTOR
PIERRE NOLLAGE

BY Craig & Antonelli
ATTORNEYS

IMPULSE GENERATOR CIRCUIT FOR THE CONTROL OF RECTIFIERS

The present invention relates to an impulse generator circuit adapted to furnish recurrent impulses of short duration with respect to the repetition period thereof, having a steep wavefront and a relatively high power output. The invention is directed to a circuit designed particularly for control of stationary apparatus for transforming a direct current into an alternating current, such as vibrators, commutators, inverters, etc., utilizing silicon controlled rectifiers, also known as "thryistors," "solid thyratons," etc. It is known that such apparatus can control or produce outputs or powers of several kVA.

The French Pat. 1,421,455 dated Oct. 30, 1964, discloses such an impulse generator circuit, which is designed more particularly for furnishing to a controlled rectifier forming part of a control system extinction impulses having a predetermined polarity inverse to the polarity of the signal used to start or energize the rectifier at the time of initiation of the conduction thereof.

The device described in the aforementioned patent is energized by a direct current source and comprises essentially a charging circuit including a capacitor in series with a resistor for charging this capacitor from the direct current source, and a circuit, hereinafter simply designated as a "discharging circuit", which comprises essentially an inductance in series with a controlled rectifier forming part of the impulse generator and hence not to be confused with the controlled rectifier or rectifiers forming part of the load apparatus to which the impulses are directed. This latter controlled rectifier is provided with a control electrode which is subjected to periodic impulses furnished by an external generator of impulses having a low level output, with a repetition frequency of 50 Hertz, for example, and plays the role of a circuit breaker. The aforementioned inductance is generally that of the primary winding of a transformer whose secondary winding furnishes the impulse having the desired relatively increased output power.

One of the characteristics of the device described in the aforementioned patent is the use, at the terminals of one of the windings of the transformer, preferably of the secondary winding thereof, of a conventional semiconductor diode whose presence has the effect that the impulse generator, after having been started by an excitation impulse, continues to operate only during the time strictly necessary for the supply of an output impulse having a predetermined duration and polarity, so as to avoid, on the one hand, disturbances in the operation of the rectifiers comprised in the load apparatus and, on the other hand, an unnecessary energy consumption on the direct current source energizing this generator.

It is the object of the present invention to provide an improved device with respect to the known systems, a novel device having the advantage of reducing, in great proportions, the consumption of direct current energy and at the same time of improving the wave form and of more satisfactorily fixing the duration of the output impulses being produced, whose peak output power must be relatively high.

As provided in the aforementioned patent, the duration of each of the output impulses being obtained remains short equal, for example, to one-fiftieth of a second in comparison to the time interval which separates two consecutive ones of these in impulses, but must nevertheless be sufficiently long to act usefully on the load apparatus. This duration will, for example, be from 25 to 50 microseconds, a range which is suitable for the extinction of a controlled rectifier in the load device and which is at the same time a fourth of the free oscillation period the resonant circuit would have, this circuit being constituted of the capacitor and the inductance mentioned hereinabove, if these latter elements were directly interconnected. The free oscillation period in question must thus be from 100 to 200 microseconds, which determines or establishes the parameters of the capacitor and of the inductance.

It has already been mentioned herein that the output impulses must also have a predetermined polarity, or at the very least a particular polarity which must be maintained for at least a considerable portion of the duration thereof. Alternatively, the amplitude thereof must remain small for the entire time interval during which the polarity thereof is other than that desired; or at least the time intervals, during which the polarity of the impulses is different from that desired, must be localized in such a manner as not to disturb the operation of the apparatus controlled.

Although the device proposed by the present invention does not furnish strictly unipolar impulses, it does meet the existing requirements in that it furnishes impulses whose first portion has a steep wavefront with the desired polarity and a sufficient duration so as to usefully act to extinguish the load apparatus, such as a controlled rectifier. Thereafter this first portion of the impulse is followed by a second portion having a polarity opposite to that desired, but this second portion appears only after the first one has already produced the desired result and, in any event, does not have an amplitude sufficient to bring about disturbances in the load apparatus. Finally, this second portion of the impulse is followed by a third portion, this time having once again the desired polarity but being in fact harmless and of short duration.

Although the impulse wave form as defined hereinbefore may a priori appear to be less advantageous than a unipolar wave form it will hereinafter be seen that it allows for a considerable reduction of the energy consumption of the impulse generator.

The circuit of the present invention differs from the known circuits by virtue of the fact that the semiconductor diode referred to hereinabove is no longer placed in parallel with the inductance, or with a transformer winding being coupled thereto, but in contrast thereto, this diode is directly connected in parallel with the controlled rectifier of the impulse generator; and in such a manner that the direction of normal conduction of this diode is inverse to that of the controlled rectifier.

In the device according to the present invention, the value of the inductance mentioned above (in this particular case, that of the primary winding of the transformer) must be chosen in such a way as to realize with the capacitance of the capacitor a resonant circuit having a proper period with respect to the duration of the desired output impulse.

Figure 2:
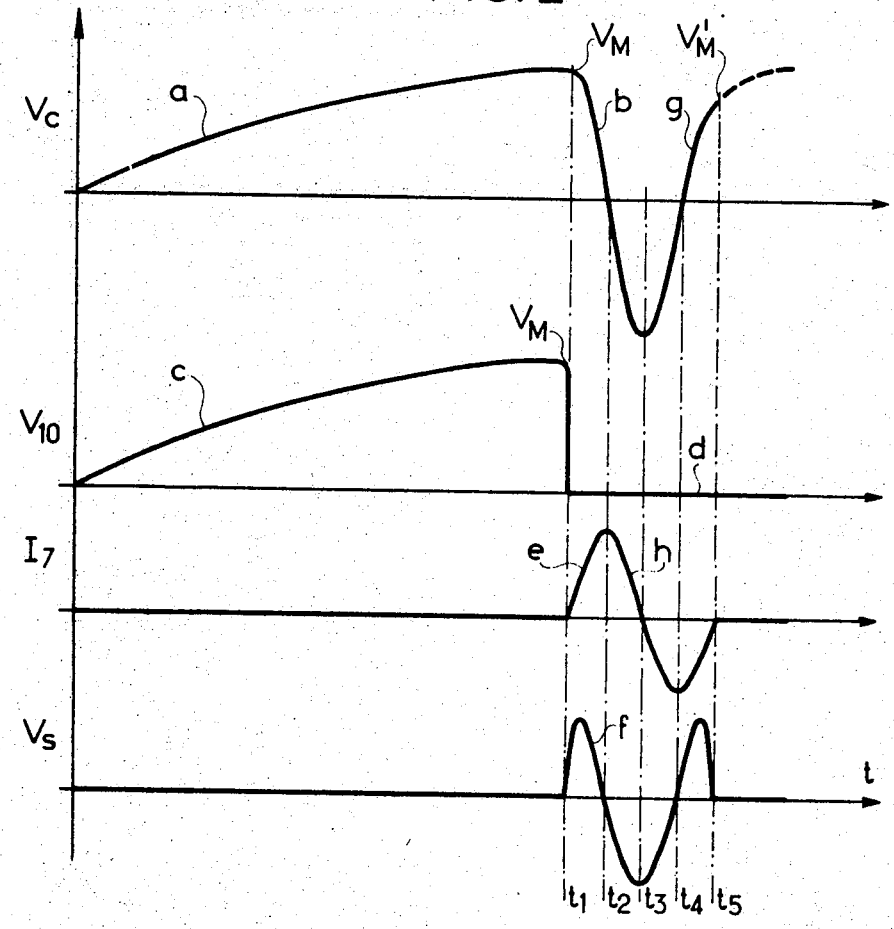

The properties and advantages of the device proposed by the present invention will be more fully understood from the following detailed description of the invention taken in connection with the accompanying drawings, wherein:

FIG. 1 is a basic schematic illustration of the circuit according to the present invention; and FIG. 2 is a diagram illustrating, as a function of the time, the values of the currents and voltages at different points of the circuit of FIG. 1 in order to facilitate the understanding of the operation of this circuit.

Referring first to FIG. 1, the circuit in accordance with the invention is provided with two input terminals 1 and 2 connected to a direct current voltage source (not shown) serving for the energization of the installation. It has been assumed here that the terminal 1 is the positive terminal and that terminal 2 is the negative one, but it is understood that this arrangement could be reversed by also inverting the directions of connection of the controlled rectifier and of the diode, which will be further discussed hereinbelow.

The source being connected between terminals 1 and 2 charges the capacitor 4 by way of the resistor 3. The time constant T in microseconds of the series combination, being equal to the product of the capacitance of the capacitor 4 expressed in microfarads and the resistance of the resistor 3 expressed in ohms, may be chosen, as will be seen presently, to be considerably greater than the desired repetition period for the output impulses.

At the initial instant when the system begins to operate, the controlled rectifier 10 not having been energized, no current flows through it, nor through the inductance constituted by the primary winding 7 of the transformer 8, and, as a result, no induced voltage appears at the terminals 17, 18 of the secondary winding 9 of this transformer, these terminals being the output terminals of the system.

The variation as a function of the time $t$ of the voltage $V_{10}$ developed between the anode 11 and the cathode 12 of the controlled rectifier 10 is represented by the curve $(c)$ of FIG. 2. During this first stage of the operation, the voltage $V_{10}$ is equal to the voltage $V_c$, represented by curve $(a)$ in FIG. 2, developed at the terminal 5 of the capacitor 4 since the rectifier 10 has not as yet been energized and is not conducting.

At the instant $t_1$ when $V_c$ and $V_{10}$ have already attained a sufficiently high chosen value $V_M$, a control impulse is applied to the energization electrode 13 (FIG. 1) of the rectifier 10 from an exterior generator of pulses which have a very short duration (not shown in the drawing). The rectifier becomes instantly conducting, the voltage $V_{10}$ at its terminals, up to then equal to $V_c$, becomes practically zero, and a current is established through primary winding 7 in the direction extending from the point 5 common to resistor 3 and capacitor 4 toward the other terminal 6 of the capacitor 4. The behavior of the voltage $V_c$ at the terminal 5 is now indicated in the diagram of FIG. 2 at part $(b)$ of the curve, whereas the voltage $V_{10}$ at the terminals of the rectifier 10 becomes approximately zero, as seen at portion $(d)$ of the curve. Through the winding 7 a current $I_7$ is established, shown by curve $(e)$, which increases rapidly up to a maximum value, which is attained at the instant $t_2$. The time interval $(t_2 - t_1)$ is essentially equal to a fourth of the period of the resonant circuit formed by capacitor 4 and winding 7 since the rectifier 10 is then practically equivalent to a short circuit. This situation persists up to that instant $t_2$ when the voltage $V_c$ at the terminals of the capacitor 4 becomes essentially zero.

At the same time, the voltage $V_s$ developed at the output terminals 17, 18 of the secondary winding 9 of the transformer 8 assumes the course indicated at $(f)$ in the lower portion of FIG. 2.

Since the free oscillation of the resonant circuit made up of capacitor 4 and winding 7 continues, the intensity of the current through winding 7 decreases, as represented by portion $(h)$ of the curve illustrating current $I_7$. This current continues to flow through the rectifier 10 which has remained energized, however no portion of this current can pass through the diode 14 which is, at that moment, in the nonconductive condition, because of its polarity, having the cathode 16 and the anode 15 thereof are respectively connected to the anode 11 and the cathode 12 of the rectifier 10. At the instant $t_3$, the intensity of the current $I_7$ is reduced to zero, after which: this current $I_7$ is inverted. Essentially $t_3 - t_2$ is equal to $t_2 - t_1$. The rectifier 10 is then improperly poled to pass the current but the current $I_7$ may now pass through the diode 14. Rectifier 10 is deenergized at this time.

The capacitor 4 which had been recharged during the time interval $(t_3 - t_2)$ up to a voltage in the neighborhood of the maximum absolute value attained at the beginning of its discharge, but in an opposite sense (in reality at a somewhat lower voltage because of the inevitable losses in the resonant circuit and in the rectifier 10 and also because of the energy consumed at the output terminals 17, 18), is once again discharged up to the instant $t_4$ when the voltage at its terminals again assumes the value zero. Then the capacitor 4 is discharged in the initial direction as seen in part $(g)$ of the upper curve $V_c$ in FIG. 2, up to a voltage $V_M$ which it achieves at the instant $t_5$, the time intervals $(t_4 - t_3)$ and $(t_5 - t_4)$ each being essentially equal to a fourth of the free oscillation period of the resonant circuit a made up of capacitor 4 and winding 7. At that moment the discharge is stopped since the rectifier 10 has been previously deenergized and cannot start to operate again until a later time when a new energization impulse will be applied to the control electrode 13 thereof. In addition, the diode 14 is at that moment also in the nonconductive condition due to its polarity.

The useful portion of the voltage $V_s$, in the lower portion of FIG. 2, is the portion $(f)$ of the curve illustrating the variation as a function of the time of $V_s$. The hatched surface in FIG. 2 corresponds in fact to an impulse having the desired polarity for the control of the load apparatus connected to the terminals 17, 18 (FIG. 1). The portion of the curve representing $V_s$ whose ordinates are negative is not useful but does not involve any drawbacks since it is assumed that the load apparatus (for example, a controlled rectifier) connected to terminals 17, 18 is already completely deenergized at the instant $t_2$ and that, as a result thereof, it remains unaffected by not too large a voltage applied thereto in a direction which tends to reenergize it, as long as it has not received a new energizing impulse on the particular one of its electrodes which is provided for that purpose. Finally, the portion $t_4 - t_5$ of the curve for $V_s$ involves no inconveniences since the voltage $V_s$ is then present in the direction of deenergizing the apparatus being connected to the output terminals 17, 18 (FIG. 1).

The principal advantage of the device proposed by the present invention as described hereinabove resides in the reduction of the energy consumption as compared to the prior art systems. As a matter of fact, after each time interval, such as $t_1 - t_5$, the capacitor 4 is recharged to a voltage $V'_M$ (FIG. 2) which, although it is lower than the voltage $V_M$ present at the instant $t_1$ when the rectifier 10 becomes conductive, is still a considerable fraction of $V_M$ by virtue of the effect of the energy recuperation allowed for by the diode 14 which remains conductive even after the rectifier 10 has ceased to conduct. The voltage $V_s$, on the other hand, is reduced to zero rapidly immediately after instant $t_5$, as is readily apparent from FIG. 2, in such a manner that at the instant $t_5$ current can no longer flow through the winding 7.

In actual fact, a stationary condition is established at the end of a small number of operating cycles, in which, thanks to the supply of energy from the direct current source connected at 1 and 2 to the condenser 4 the voltage $V'_M$ at the terminals thereof reassumes rapidly the value $V_M$ after the instant $t_5$. However, by virtue of the operation as described hereinabove, the source in question has to supply only a complementary energy, which renders it possible to considerably increase the value of the resistor 3 and consequently to reduce to a large extent the supply energy necessary for the operation.

I have shown and described one embodiment in accordance with the present invention. It is understood that the same is not limited thereto but is susceptible of numerous changes and modifications as known to a person skilled in the art and I, therefore, do not wish to be limited to the details shown and described herein, but intend to cover all such changes and modifications as are encompassed by the scope of the appended claims.

I claim:

1. An impulse generator for periodically generating at a low frequency an impulse having a steep wavefront which maintains a predetermined polarity for a minimum time interval much smaller than the period at said frequency, comprising:
   a capacitor;
   a charging circuit connected to said capacitor including a direct current source for charging said capacitor from said source through a resistor;
   a series circuit made up of an inductance which forms the primary winding of a transformer whose secondary winding provides the output of said generator and a voltage controlled rectifier having an anode, a cathode, and an energizing electrode, said series circuit being connected in parallel with said capacitor;
   a diode connected in parallel with said voltage controlled rectifier between the anode and cathode thereof, and being poled oppositely to said rectifier;
   means for applying to said energizing electrode short duration control pulses at said low frequency; and
   said impulse generator being characterized in that the product of the resistance of said resistor by the capacity of said capacitor is much higher than said period and that said inductance and capacitor are so dimensioned that one-fourth of the free oscillation period of the resonant circuit formed thereby is substantially equal to said minimum time interval.

2. An impulse generator as defined in claim 1 further including output means for deriving from said inductance an impulse voltage proportional to the voltage developed thereacross and an additional voltage controlled rectifier connected to said output means and extinguishable by said impulse voltage, said minimum time interval being longer than the deenergizing time of said additional controlled rectifier.